United States Patent [19]

Norimatsu

[11] Patent Number: 5,732,348
[45] Date of Patent: Mar. 24, 1998

[54] CELLULAR TELEPHONE SET CAPABLE OF AUTOMATICALLY SELECTING A CONTROL CHANNEL WITHOUT SWITCHING OPERATIONAL MODES FROM ONE TO ANOTHER

[75] Inventor: Noriko Norimatsu, Tokyo, Japan

[73] Assignee: NEC Corporation, Tokyo, Japan

[21] Appl. No.: 429,856

[22] Filed: Apr. 27, 1995

[30] Foreign Application Priority Data

Apr. 28, 1994 [JP] Japan .................................... 6-113599

[51] Int. Cl.⁶ ............................................... H04Q 7/32
[52] U.S. Cl. ............................................ 455/434; 455/552
[58] Field of Search .................................... 379/58, 59, 60,
379/63; 455/33.1, 33.2, 54.1, 422, 432,
434, 435, 550, 551, 552

[56] References Cited

U.S. PATENT DOCUMENTS 5,255,307  10/1993  Mizikovsky ............................ 379/58
5,442,806  8/1995   Barber et al. ......................... 455/33.1
5,444,765  8/1995   Marui et al. ........................... 379/59

*Primary Examiner*—William Cumming
*Assistant Examiner*—William G. Trost
*Attorney, Agent, or Firm*—Sughrue, Mion, Zinn, Macpeak & Seas, PLLC

[57] ABSTRACT

In a cellular telephone set for monitoring a control channel, an EEPROM memorizes both a home SID number and a sub-home SID number. A radio section seeks four radio channels within a radio frequency band under control of a CPU and successively receives radio signals through the radio channels to produce a sequence of received data signals. The CPU detects an operational SID number from each of the received data signals to compare the operational SID number with the home SID number and to further compare the operational SID number with the sub-home SID number only when the operational SID number does not coincide with the home SID number. The CPU selects, as a selected channel, one of the radio channels based on a result of the comparison and makes the radio section tune the selected chancel to monitor the selected channel as the control channel.

4 Claims, 6 Drawing Sheets

1

CELLULAR TELEPHONE SET CAPABLE OF AUTOMATICALLY SELECTING A CONTROL CHANNEL WITHOUT SWITCHING OPERATIONAL MODES FROM ONE TO ANOTHER

BACKGROUND OF THE INVENTION

This invention relates to a cellular telephone set for monitoring a control channel which is selected from a predetermined radio frequency band to sup up a speech channel.

A conventional cellular telephone set makes a contract with a particular cellular telephone service company so as to enjoy a desired telephone service. It is usual that the particular cellular telephone service company has a particular service area. If the particular cellular telephone service company makes a roaming contract with other companies which have other service areas different from the particular service area, the conventional cellular telephone set can also receive the desired telephone service from those companies in the other service areas.

According to the EIA (Electronic Industries Association) standard, a predetermined radio frequency band for such a cellular telephone system is divided into two controllable channel bands so that two cellular telephone service companies can provide individual telephone services in the same service area, such as a town, a city. In this event, one of the cellular telephone service companies uses one of the controllable channel bands for transmitting control data signals therethrough while the other cellular telephone service company uses the other controllable channel band in the service area.

The conventional cellular telephone set is operable in three different operational modes. More specifically, one of the three operational nodes is called a home mode, while the remaining modes are called a selection mode and a standard mode. In the home mode, the conventional cellular telephone set selects a predetermined controllable channel band and can receive the telephone service from the particular cellular telephone service company. In the selection mode, the conventional cellular telephone set selects either of the two controllable channel bands and can receive the telephone service from the other companies which make the roaming contract with the particular cellular telephone service company. In the standard mode, the conventional cellular telephone set does not distinguish the two controllable channel bands.

A user of a conventional cellular telephone set switches the operational modes from one to another in accordance with his or her situations. At any rate, whenever the conventional cellular telephone set moves from one service area to another service area, the user must manually switch the operational modes from one to another. Such manual switching has been often forgotten by the user. As a result, interruption of communication has often taken place in the conventional cellular telephone set.

SUMMARY OF THE INVENTION

It is therefore an object of this invention to provide a cellular telephone set which can automatically select a control channel without the manual switching of operational modes.

It is another object of this invention to provide a cellular telephone set which preferentially selects a control channel which is transmitted by a particular company to which a user subscribes.

Other objects of this invention will become clear as the description proceeds.

On describing the gist of this invention, it is possible to understand that a cellular telephone set is assigned with a home system ID number and a sub-home system ID number. The cellular telephone set monitors a control channel which is selected from a predetermined radio band to set up a speech channel between the cellular telephone set and a base station. The base station transmits a control data signal which includes an operational system ID number through the control channel.

According to the above-mentioned aspect of this invention, the cellular telephone set comprises memorizing means for memorizing said home system ID number and said sub-home system ID number, seeking means for seeking a predetermined number of radio channels within said predetermined radio band to selected in the order of electric field strength, receiving means for receiving radio signals through said radio channels to produce a sequence of received data signals, detecting means for detecting said operational system ID number from each of said received data signals, comparing means for comparing said operational system ID number with the home system ID number to produce a first coincidence signal when said operational system ID number coincides with said home system ID number and for further comparing said operational system ID number with the sub-home system ID number to produce a second coincidence signal when said operational system ID number does not coincide with said home system ID number and when said operational system ID number coincides with said sub-home system ID number, selecting means for selecting, as a selected radio channel, one of said radio channels based on said first and second coincidence signal, and monitoring means for monitoring said selected radio channel as said control channel.

DESCRIPTION OF THE PREFERRED EMBODIMENT

Figure 1:
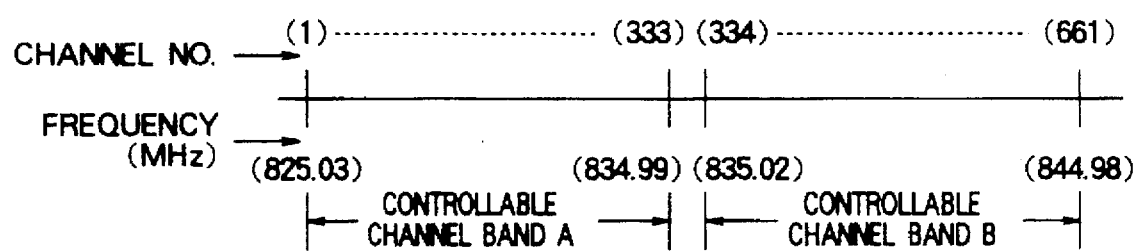
FIG. 1 shows a radio frequency band used by a cellular telephone system.
Figure 2:
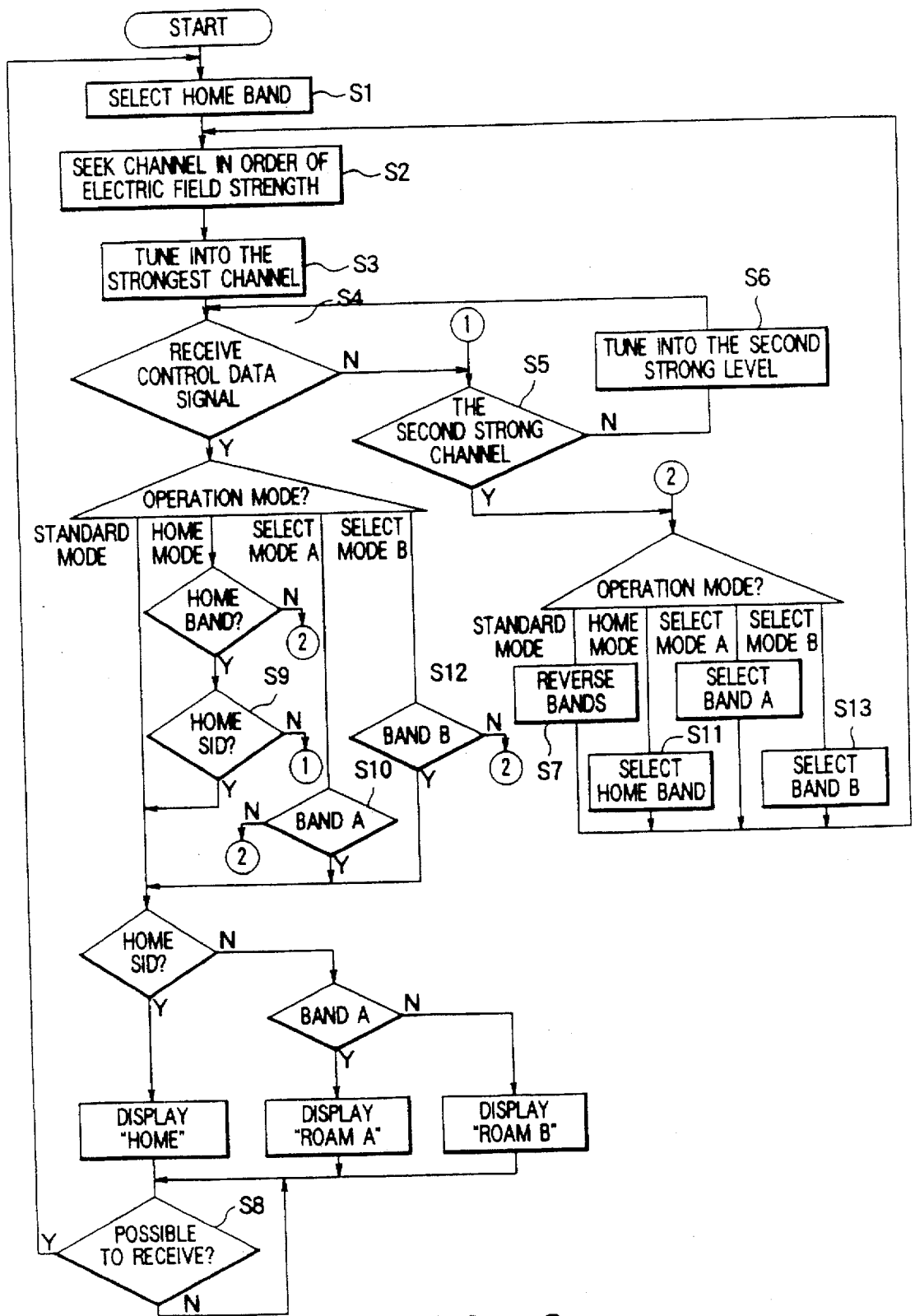
FIG. 2 is a flow chart for use in describing a conventional cellular telephone set.

Referring to FIGS. 1 and 2, a conventional cellular telephone set will first be described in order to facilitate an understanding of the present invention.

The conventional telephone set is assumed to be matched with the EIA (electronic industries association) standard. The EIA standard defines a radio frequency band for a cellular telephone system. Specifically, the radio frequency band has 666 channels arranged between 825.03 MHz and 844.98 MHz and is divided into two controllable channel bands A and B, as depicted in FIG. 1. It is to be noted that each of the controllable channel bands A and B includes a plurality of control channels and a plurality of speech channels.

The telephone system includes a plurality of cellular telephone service companies each of which is assigned with an operational system ID number and is allowed to use either one of the bands A or B so as to provide a telephone service in each service area. The other controllable channel band may be used by another cellular telephone service company in the service area. Therefore, two of the cellular telephone service companies can provide different telephone services in the same service area.

Let the conventional telephone set make a telephone service contract with one of the cellular telephone service companies with be assigned with a specific home system ID number from the cellular telephone service company. The specific home system ID number corresponds to the operational system ID number which is given to the cellular telephone service company.

Hereinunder, the cellular telephone service company will be called a home service company while its service area will be called a home service area. The controllable channel band A or B used by the home service company will be called a home band. If the home service company makes a roaming contract with other cellular telephone service companies, each of the will be called a roaming service company while its service area will be called a roaming service area.

Each of the cellular telephone service companies divides its own service area into a plurality of cells in which base stations are arranged, respectively. Each of the base stations is connected to a central station (not shown).

The conventional cellular telephone set must receive a control data signal from the base station so as to set up a speech channel which the base station. When the conventional cellular telephone set is located in the home area, the conventional cellular telephone set preferably receives the control data signal from the base station which belongs to the home service company. In spite of this fact, if the conventional cellular telephone set receives the control data signal from a base station which does not belong to the home service company, the speech channel is not set up, or payment of a higher toll is required.

Similarly, it is desirable that the conventional cellular telephone set receives the control data signal from the base station which belongs to the roaming service company when the conventional cellular telephone set is located in the roaming area.

Taking the above into consideration, the conventional cellular telephone set has three operational modes which are composed of a home mode, a selection mode, and a standard mode. The home mode is used when the conventional cellular telephone set is located in the home service area. On the other hand, the selection mode is selected and used when the conventional cellular telephone set is located in the roaming service area. Furthermore, the standard mode is used when the conventional cellular telephone set is located in unfamiliar place. Each of the operational modes is manually selected by pushing down a bottom (not shown) or so. Referring to FIG. 2, the above-mentioned operation of the conventional cellular telephone set will be described in detail.

In the standard mode, the conventional cellular telephone set seeks a predetermined number, for example, two, of channels in the order of electric field strength in each of the radio bands A and B (steps S1, S2, and S7). Then, the conventional cellular telephone set tries to successively receive a control data signal through each of the sought channels in the seeking order (steps S3, S4, S5, and S6). If the conventional cellular telephone set receives the control data signal at step S4, the conventional cellular telephone set monitors the selected channel which is used to transmit the control data signal until reception of the control data signal becomes impossible (step S8).

In the home mode, the conventional cellular telephone set seeks a predetermined number of channels in the order of electric field strength in the home band (steps S1 and S2). Specifically, the channel which is initially sought or selected has the highest field strength. Then, the conventional cellular telephone set is operable to receive a control data signal through each of the sought channels in the seeking order (steps S3, S4, S5, and S6). If the conventional cellular telephone set receives the control data signal (step S4), the conventional cellular telephone set detects the operational system ID number from the control data signal. Then, the conventional cellular telephone set compares the operational system ID number with the home system ID number (step S9). If the operational system ID number is identical with the home system ID number, the conventional cellular telephone set continuously monitors the selected channel as long as the control data signal is received through the selected channel (step S8).

In the selection mode, the conventional cellular telephone set seeks the predetermined number of channels in a manner similar to the home mode in connection with the selected band A or B (steps S1, S2, S10, S11, S12, and S13). Then, the conventional cellular telephone set is put into operation to receive a control data signal through each of the selected channels in the seeking order (steps S3, S4, S5, and S6). If the conventional cellular telephone set receives the control data signal, the conventional cellular telephone set monitors the channel as long as the control data signal is received through the selected channel.

The conventional cellular telephone set may have a plurality of home system ID numbers, for example, when the home company unites with the other cellular telephone service companies. In this case, it is necessary to select one from the home system ID numbers and to select one from the radio bands A and B. Therefore, input operation is troublesome in the conventional cellular telephone set.

In addition, a user must remember either the band A or the band B used by each of the cellular telephone service companies. If the user selects an unused band by mistake, either the toll for a telephone call will be charged, or the speech channel can not be established.

Figure 3:
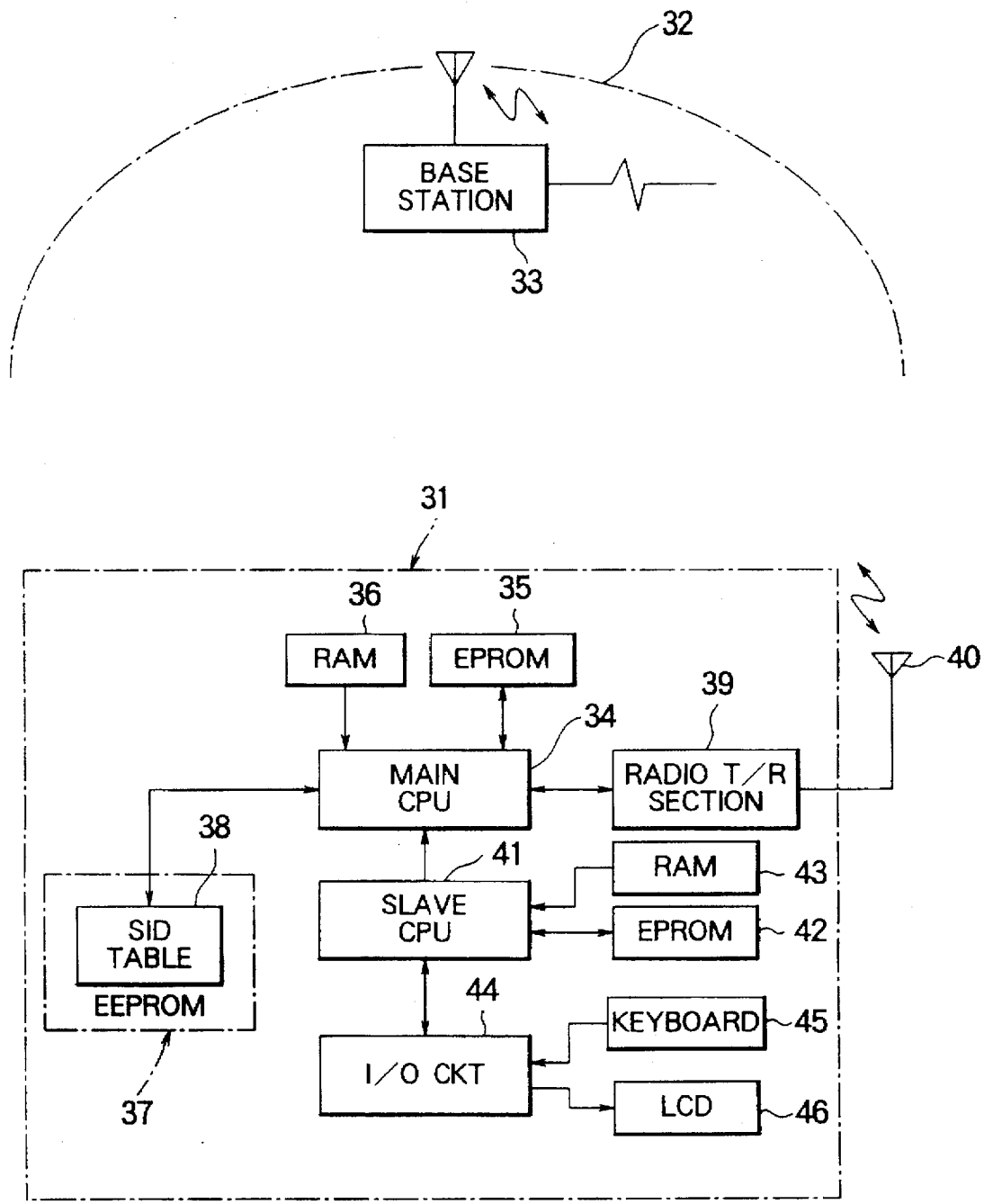
FIG. 3 is a block diagram of a cellular telephone set according to a first embodiment of this invention.
Figure 4A:
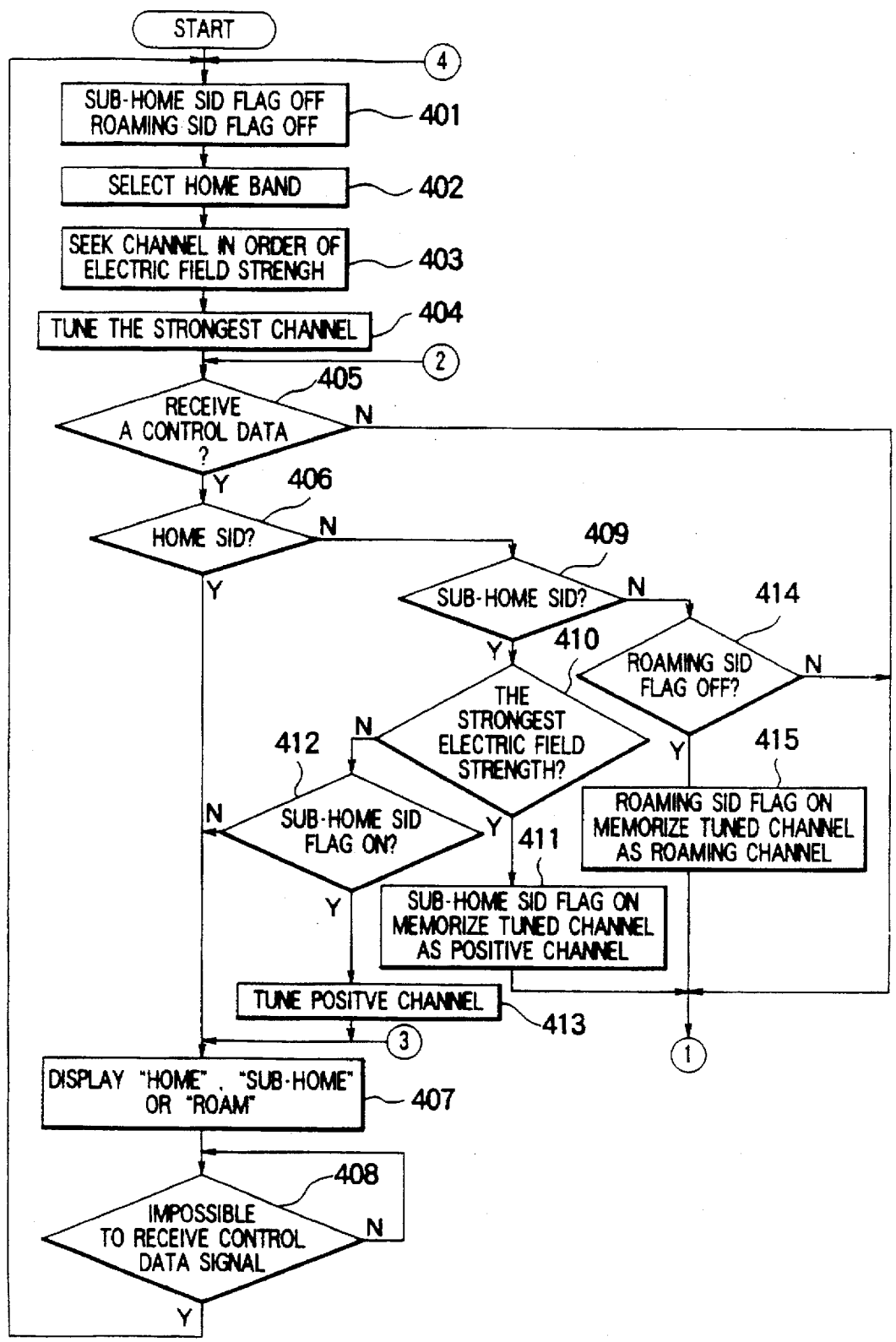
FIG. 4 is a flow chart for use in describing the cellular telephone set depicted in FIG. 3.
Figure 4B:
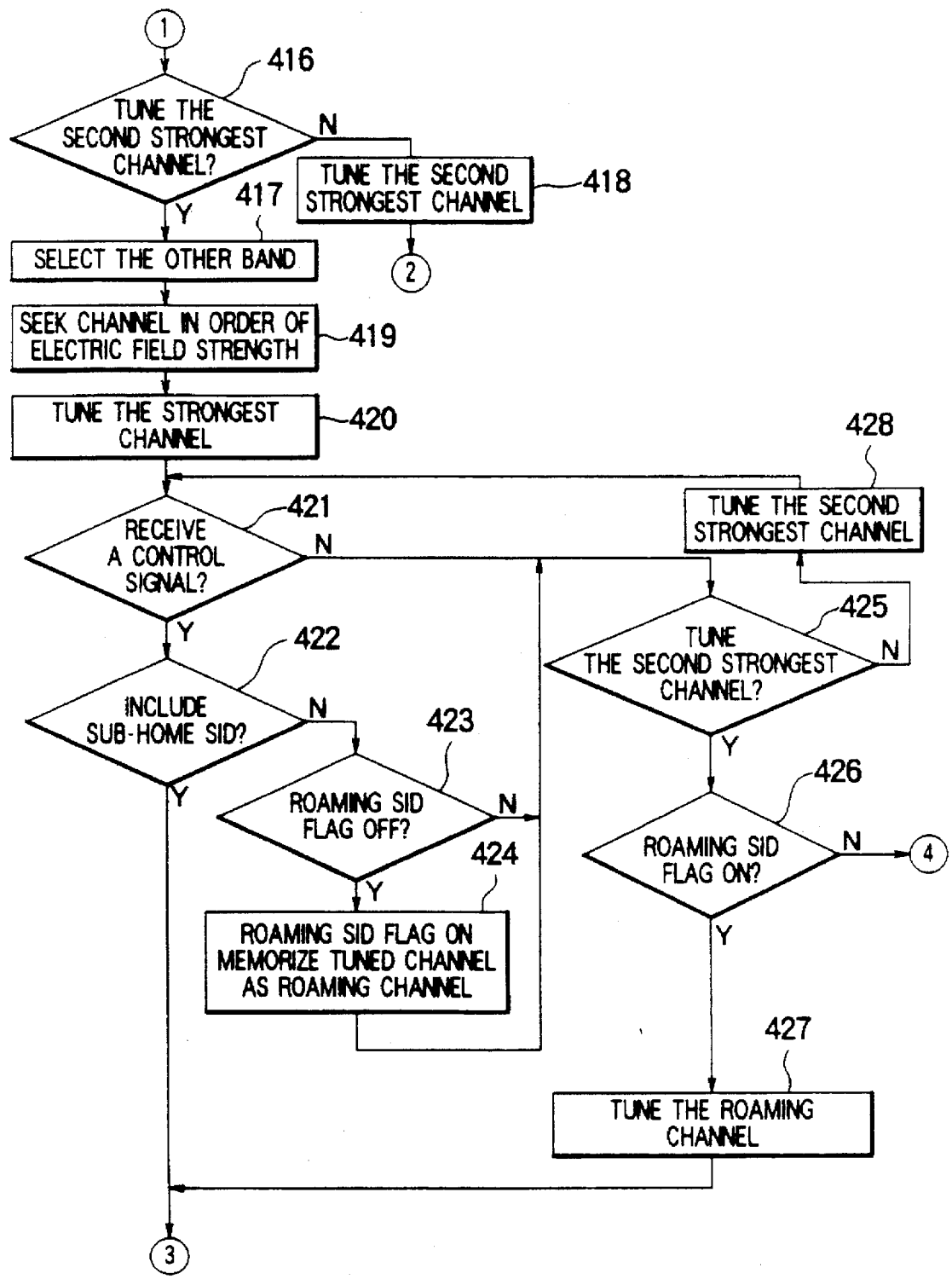

Referring to FIGS. 3 and 4, description will proceed to a cellular telephone set according to a first embodiment of this invention.

In FIG. 3, the cellular telephone set 31 is located in a cell 32. A base station 33 is arranged tin the cell 32. The base station 33 is connected to a central base station (not shown).

The cellular telephone set 31 comprises a main CPU 34 which controls each section. An EPROM 35 is connected to the main CPU 34 and memorizes a main program for the main CPU 34. An RAM 36 is connected to the main CPU 34 for working of the main CPU 34. An EEPROM 37 is connected to the main CPU 34 and has a system ID table (SID table) 38. The system ID table memorizes at least a home system ID (home SID) number and may memorize a plurality of sub-home system ID (sub-home SID) numbers. A radio transmission/reception section (radio T/R section) 39 is connected to the main CPU 34 and to an antenna 40 for radio communication with the base station 33. A slave CPU 41 is connected to the main CPU 34 to control input/output operation and display operation. An EPROM 42 is connected to the slave CPU 41 and memorizes a subprogram for the slave CPU 41. An RAM 43 is connected to the slave CPU 41 for working of the slave CPU 41. An I/O circuit 44 is connected to slave PCU 41 for processing input operational signals and displaying signals. A keyboard 45 is connected to the I/O circuit 44 for supplying the input operational signals. An LDC 46 is connected to the I/O circuit 44 in accordance with the displaying signals.

The main CPU 34 reads out the main program from the EPROM 35. The slave CPU 41 reads out the subprogram from the EPROM 42. The main CPU 34 carries out the control operation in cooperation with the slave CPU 41. At this time, the main CPU 34 reads out the home SID number and the sub-home SID number from the SID table 38 of the EEPROM 37.

The radio T/R section 39 is controlled by the main CPU 34 so as to be put into a waiting or a standby state. In the waiting state, the radio T/R section 39 monitors one of control channels.

The slave CPU 41 exchanges data signals with the main CPU 34 in order to make the LCD 45 display. For example, the LCD displays operational modes, a completion of setting up speech channel, electric field strength (receiving condition), and input data from the keyboard 44.

In FIGS. 4(A) and (B), the main CPU 34 turns off a sub-home SID flag and a roaming SID flag which are provided in the EEPROM 37 when power is supplied, as depicted at a first step 401.

The main CPU 34 selects the home band from the control channel bands at a second step 402. Then, the main CPU 34 makes the radio T/R section 39 scan the home band. The main CPU 34 seeks two channels in the order of electric field strength based on results of the scanning in the radio T/R section 39 at a third step 403. The main CPU 34 makes the radio T/R section 39 tune in to the channel which has the strongest electric field strength at a fourth step 404.

The main CPU 34 judges at a fifth step 405 whether a control data signal is received by the radio T/R section 39 through the tuned channel. When the control data signal is received, the main CPU 34 detects an operational system ID number from the control data signal. When the control data signal is not received, the fifth step 405 jumps to a sixteenth step 416.

The main CPU 34 compares the operational system ID number with the home SID number at a sixth step 406. If the operational system ID number coincides with the home SID number, the main CPU 34 informs the slave CPU 41 of the coincidence. The slave CPU 41 make a display of "Home" on the LCD 45 at a seventh step 407. Then, the main CPU 34 monitors the tuned channel at an eighth step 408 until the electric field strength of the tuned channel is lowered or weakened under a predetermined value. If the electric field strength of the tuned channel becomes low in comparison with the predetermined value, the eighth step 408 returns back to the first step 401.

At the sixth step 406, when the operational system ID number does not coincide with the home SID number, the sixth step 406 goes to a ninth step 409. The main CPU 34 compares each of the operational system ID numbers with each of the sub-home SID numbers at the ninth step 409. If the operational system ID number corresponds to one of the sub-home SID numbers, the ninth step 409 proceeds to a tenth step 410.

At the tenth step 410, if the tuned channel has the strongest electric field strength, the tenth step 410 goes to an eleventh step 411. The main CPU 34 turns on the sub-home SID flag of the EEPROM 37 and writes the tuned channel number as the positive channel into the RAM 36 at the eleventh step 411. Then, the eleventh step 411 goes to the sixteenth step 416.

At the tenth step 410, if the tuned channel has the second strongest electric field strength, the tenth step 410 is followed by a twelfth step 412. The main CPU 34 monitors the sub-home SID flag at the twelve step 412. If the sub-home SID flag is put into an on state, the main CPU 34 reads out the positive channel number from the RAM 36 and makes the radio T/R section 39 tune in to the positive channel. Then, the LCD 45 provides a display of "Sub-Home" under control of the slave CPU 41 at the seventh step 407. At the twelfth step 412, if the sub-home SID flag is put into an off state, the twelfth step 412 is succeeded by the seventh step 407. In this case, the LCD 45 displays "Sub-Ho me" also.

At the ninth step 409, if the operational system ID number does not correspond to each of the sub-home SID numbers, the ninth step 409 goes to a fourteenth step 414. When the EEPROM does not memorize the sub-home SID numbers, the ninth step 409 is followed by the fourteenth step 414 also.

The main CPU 34 monitors the roaming SID flag of the EEPROM 37 at the fourteenth step 414. If the roaming SID flag is put into an off state, the main CPU 34 turns on the roaming SID flag and writes the tuned channel number as the roaming channel number into the RAM 36 at a fifteenth step 415. The fifteenth step 415 goes to the sixteenth step 416. At the fourteenth step 414, if the roaming flag is turned on, the fourteenth step 414 also goes to the sixteenth step 416.

The main CPU 34 judges at the sixteen step 416 whether the tuned channel has the second strongest electric field strength. If the tuned channel has the second strongest electric field strength, the main CPU 34 selects the other band of two control channel bands at a seventeenth step 417. On the other hand, if the tuned channel has the strongest electric field strength, the main CPU 34 makes the radio T/R section 39 tune in to the other channel which has the second strongest field strength at an eighteenth step 418. The eighteenth step 418 returns back to the fifth step 405.

The main CPU 34 seeks two channels in the order of electric field strength at a nineteenth step 419 like at the third step 403. Then, the main CPU 34 makes the radio T/R section 39 tune in to the channel which has the strongest electric field strength at a twentieth step 420.

The main CPU 34 judges at a twenty-first step 421 whether or not a control data signal is received. If the control data signal is received, the main CPU 34 detects an operational system ID number from the control data signal. The main CPU 34 compares the operational system ID number with each of the sub-home SID numbers at a twenty-second step 422. If the operational system ID number corresponds to one of the sub-home SID numbers, the twenty-around step 422 goes to the seventh step 407. In this time, the LCD displays "Sub-Home" at the seventh step 407.

At the twenty-second step 422, if the operational system ID number does not correspond to each of the sub-home SID number, the twenty-second step 422 go to a twenty-third step 423. When the EEPROM 37 does not memorize the sub-home SID numbers, the twenty-second step 422 is followed by the twenty-third step 423 also.

The main CPU 34 monitors the roaming SID signal flag of the EEPROM 37 at the twenty-third step 423. If the roaming SID flag is turned off, the main CPU 34 turns on the roaming SID flag and writes the tuned channel number as the roaming channel number at a twenty-fourth step 424. The twenty-fourth step 424 goes to a twenty-fifth step 425. At the twenty-third step 423, if the roaming SID flag is put into the on state, the twenty-third state 423 goes to the twenty-fifty step 425.

The main CPU 34 judges at the twenty-fifty step 425 whether the tuned channel has the second strongest electric field strength. If the tuned channel has the second strongest electric field strength, the main CPU 34 sees the roaming SID flag at a twenty-sixth step 426. If the roaming SID flag is the one state, the main CPU 34 makes the radio T/R section 39 tune in to the roaming channel at a twenty-seventh step 427. The twenty-seventh step 427 is succeeded by the seventh step 407. In this case, the LCD 45 displays "Roam".

At the twenty-sixth step 426, if the roaming SID flag is turned off, the twenty-sixth step 426 returns back to the first step 401.

At the twenty-fifth step 425, if the tuned channel has the strongest electric field strength, the twenty-fifth step 425 goes to a twenty-eighth step 428. The main CPU 34 makes the radio T/R section 39 tune in to the channel which has the second strongest electric field strength at the twenty-eighth step 428. The twenty-eighth step 428 returns back to the twenty-first step 421.

Therefore, the cellular telephone set preferentially selects a control channel which is supplied from the home service company, the roaming company, and the other company, in order.

Figure 5:
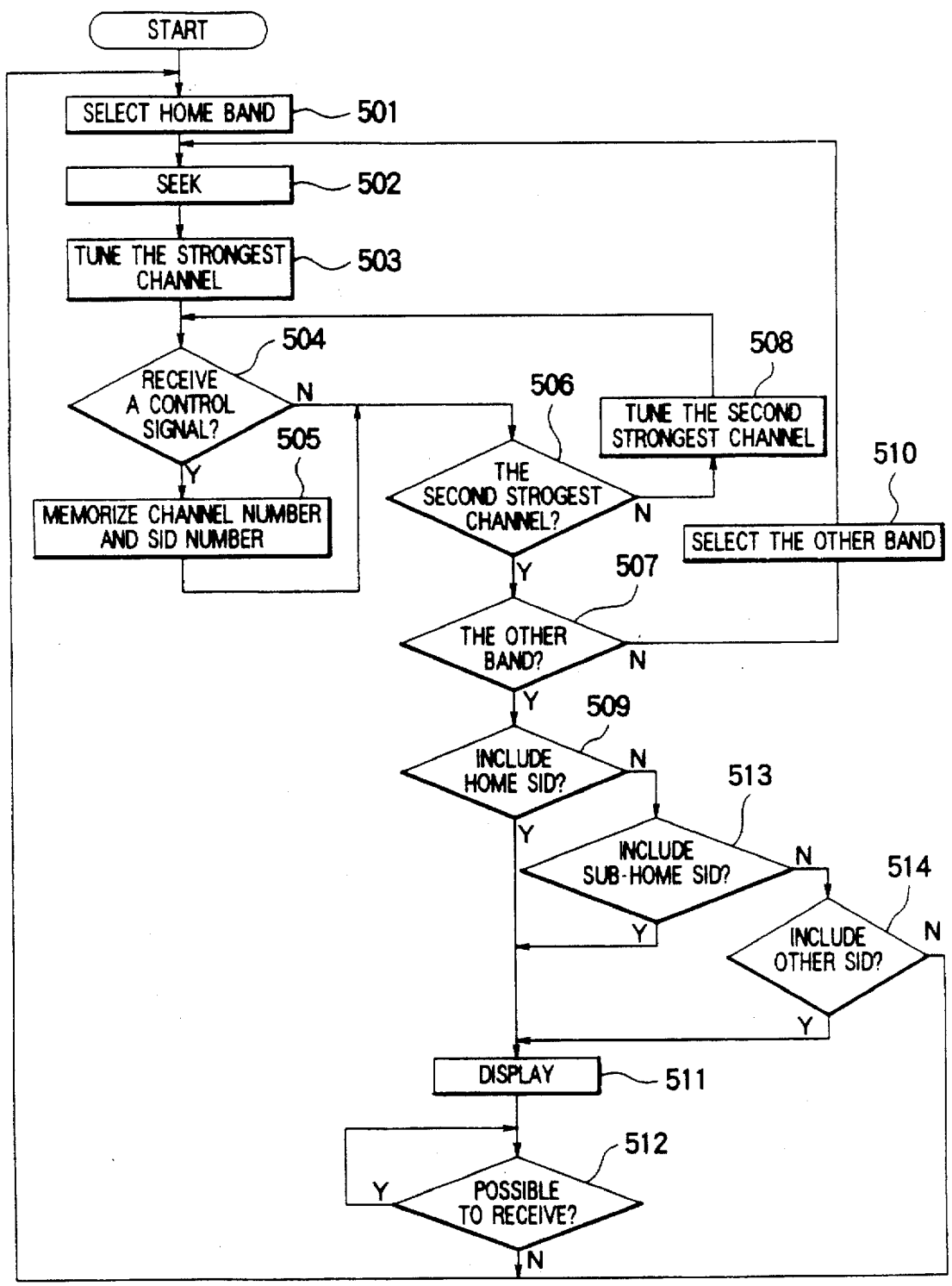
FIG. 5 is a flowchart for use in describing a cellular telephone set according to a second embodiment of this invention.

Referring to FIG. 5 with FIG. 3, description will be directed to a cellular telephone set according to a second embodiment of this invention.

The main CPU 34 selects the home band from the two control channel bands at a first step 501. The main CPU 34 seeks two channels in the order of electric field strength at a second step 502 and makes the radio T/R section 39 tune in to the channel which as the strongest electric field strength at a third step 503.

The main CPU 34 judges at a fourth step 504 whether a control data signal is received. If the control data signal is received, the main CPU 34 make the RAM 36 memorize the tuned channel number and an operational system ID number which is included in the control data signal at a fifth step 505. If the control data signal is not received, the fourth step 504 goes to a sixth step 506.

The main CPU 34 judges at the sixth step 505 whether or not the tuned channel has the second strongest electric field strength. If the tuned channel has the second strongest electric field strength, the sixth step 506 is followed by a seventh step 507. If the tuned channel has the strongest electric field strength, the main CPU 34 makes the radio T/R section 39 tune in to the channel which has the second strongest electric field strength at an eighth step 508. The eighth step 508 returns back to the fourth step 504.

At the seventh step 507, the CPU judges whether the other band of the control channel band is selected at the seventh step 507. If the other band is selected, the seventh step 507 goes to a ninth step 509. If the other band is not selected, the main CPU 34 selects the other band at a tenth step 510. The tenth step 510 returns back to the second step 502.

At the ninth step 509, the main CPU 34 looks for the same number as the home SID number from the operational SID numbers which are memorized in the RAM 36. If the same number as the home SID number is detected from the operational SID numbers, the main CPU 34 informs the slave CPU 40 of the detector of the same number. The slave CPU 40 makes a display of "Home" on the LCD 45 at an eleventh step 511. Then, the radio T/R section 39 tunes in to a memorized channel which is related to the detected operational SID number under control of the main CPU 34. The main CPU 34 monitors the tuned channel at a twelfth step 512 until the electric field strength of the tuned channel becomes less than a predetermined value. If the electric field strength of the tuned channel is less than the predetermined value, the twelfth step 512 returns back to the first step 501.

At the ninth step 509, if the same number as the home SID number is not detected from the operational SID numbers, the ninth step 509 goes to a thirteenth step 513. The main CPU 34 looks for the same number as each of the sub-home SID numbers from operational SID numbers which are memorized in the RAM 36. If the same number as one of the sub-home SID numbers is detected from the operational SID numbers, the thirteenth step 513 is succeeded by the eleventh step 511. In this case, the LCD 45 displays "Sub-Home".

At the thirteen step 513, if the same number as each of the sub-home SID numbers is not detected from the operational SID numbers, the thirteen step 513 goes to a fourteenth step 514. The main CPU 34 looks for another SID number from operational SID numbers which is memorized in the RAM 36 at the fourteenth step 514. If the main CPU 34 detects the other SID number, the fourteenth step 514 goes to the eleventh step 511. In this event, the LCD 45 displays "Roam".

At the fourteenth step 514, if the main CPU 34 does not detect the other SID number, the fourteenth step 514 returns back to the first step 501.

Therefore, the cellular telephone set preferentially selects a control channel which is supplied from the home service company, the roaming company, and the other company, in order.

What is claimed is:

1. A cellular telephone set assigned with a home system ID (SID) number and a sub-home system ID number for monitoring a control channel which is selected from a predetermined radio band having first and second control channel bands to set up a speech channel between said cellular telephone set and a base station which transmits a control data signal including an operational system ID number thorough said control channel, said cellular telephone set comprising:

SID memorizing means for memorizing said home system ID number and said sub-home system ID number;

first scanning means for scanning said first control channel and ordering a predetermined number of first radio channels within said first control channel band in order of electric field strength;

first receiving means for receiving first radio signals through said first radio channels to produce a sequence of first received data signals;

first detecting means for detecting a first operational system ID number as said operational system ID number from each of said received data signals;

first comparing means for comparing said first operational system ID number with the home system ID number to produce a first coincidence signal when said first operational system ID number coincides with said home system ID number and for further comparing said first operational system ID number with the sub-home system ID number to produce a second coincidence signal when said first operational system ID number coincides with said sub-home system ID number;

second scanning means, operative only in response to non-coincidence of said first operational system ID number with neither of said home system ID number and said sub-home system ID number, for scanning said second control channel band and ordering a predetermined number of second radio channels within said second control channel band in order of electric field strength;

second receiving means for receiving second radio signals through said second radio channels to produce a sequence of second received data signals;

second detecting means for detecting a second operational system ID number as said operational system ID number from each of said second received data signals;

second comparing means for comparing said second operational system ID number with the sub-home system ID number to produce a third coincidence signal when said operational system ID number coincides with said sub-home system ID number;

selecting means for selecting, as a selected radio channel, one of said first and second radio channels based on said first, said second, and said third coincidence signals; and monitoring means for monitoring said selected radio channel as said control channel.

2. A cellular telephone set as claimed in claim 1, wherein said memorizing means further memorizes at least one additional sub-home system ID number together with said sub-home system ID number.

3. A cellular telephone set as claimed in claim 1, said cellular telephone set further assigned with a roaming system ID number which is memorized in said SID memorizing means, wherein said first comparing means further compares said first operational system ID number with the roaming system ID number to produce a fourth coincidence signal when said first operational system ID number coincides with neither said home system ID number nor said sub-home system ID number but does coincide with said roaming system ID number; and said second comparing means further compares said second operation system ID number with the roaming system ID number to produce a fifth coincidence signal when said second operational system ID number does not coincide with said sub-home system ID number but does coincide with said sub-home system ID number; and said selecting means for selecting, as a selected radio channel, one of said first and second radio channels based on said first, said second, said third, said fourth, and said fiftt coincidence signals.

4. A method of selecting a control channel from a predetermined radio band having first and second control channel bands to monitor said control channel in a cellular telephone set, said cellular telephone set assigned with a home system ID number and a sub-home system ID number, a base station transmitting a control data signal including an operational system ID number through said control channel, said method comprising the steps of:

memorizing said home system ID number and said sub-home system ID number;

scanning through said first control channel band to select predetermined number of first radio channels in order of electric field strength;

receiving first radio signals through said first radio channels to produce a sequence of first received data signals;

detecting a first operational system ID number as said operational system ID number from each of said first received data signals;

comparing said first operational system ID number with the home system ID number to produce a first coincidence signal when said first operational system ID number coincides with said home system ID number;

further comparing said first operational system ID number with the sub-home system ID number when said first operational system ID number does not coincide with said home system ID number to produce a second coincidence signal when said first operational system ID number coincides with said sub-home system ID number;

scanning through said second control channel band only when said first operational system ID number coincides with neither said home system ID number nor said sub-home system ID number, to select a predetermined number of second radio channels in order of electric field strength;

receiving second radio signals through said second radio channels to produce a sequence of second received data signals;

detecting a second operational system ID number as said operational system ID number from each of said second received data signals;

comparing said second operational system ID number with the sub-home system ID number to produce a third coincidence signal when said operational system ID number coincides with said sub-home system ID number;

selecting, as a selected radio channel, one of said first and second radio channels based on said first, said second, and said third coincidence signals; and monitoring said selected radio channel as said control channel.

* * * * *